(12) United States Patent
MacLennan et al.

(10) Patent No.: US 9,719,060 B1
(45) Date of Patent: Aug. 1, 2017

(54) BREWING APPARATUS AND METHOD

(71) Applicants: Ian MacLennan, Vancouver (CA); Beau Dudley, Woodland, CA (US)

(72) Inventors: Ian MacLennan, Vancouver (CA); Beau Dudley, Woodland, CA (US)

( * ) Notice: Subject to any disclaimer, the term of this patent is extended or adjusted under 35 U.S.C. 154(b) by 168 days.

(21) Appl. No.: 13/999,662

(22) Filed: Mar. 14, 2014

(51) Int. Cl.
*C12C 11/00* (2006.01)

(52) U.S. Cl.
CPC .................................. *C12C 11/006* (2013.01)

(58) Field of Classification Search
CPC ....... C12C 11/003; C12C 11/00; C12C 13/10; C12C 13/00; C12C 11/006
USPC .... 426/16, 592, 11, 29, 590, 600, 330.4, 28, 426/7; 99/276, 278, 275
See application file for complete search history.

(56) References Cited

U.S. PATENT DOCUMENTS

2016/0201018 A1* 7/2016 Watson .................. C12C 13/10
426/11

FOREIGN PATENT DOCUMENTS

DE 3804582 A1 * 8/1989

* cited by examiner

*Primary Examiner* — Vera Stulii

(57) ABSTRACT

A brewing system for fermenting beer when isolated from any possible micro-biological contamination comprises a first holding frame in a fermentation tank, a second holding frame in a bright beer tank, a water supply subsystem that is effective to measure, filter, and expose incoming water to UV light, a mixing subsystem that is effective to connect fittings or glands clamped onto manifolds of the fermentation and bright beer tanks, and aseptic dry, sealed bags containing dry ingredients of powdered malt extract, beer mixes, hops, and yeast. The brewing system includes a valve for connecting the water supply subsystem to the fermentation tank, and a mechanism for transferring the powdered malt into a disposable second aseptic dry, sealed fermenter bag for fermentation in the fermentation tank to form fermented beer. The disposable fermenter bag has ports on a bottom manifold and is designed to fit into the first holding frame that is insulated and custom controls its temperature. A transfer mechanism directs the fermented beer into a third aseptic bag disposed on a second holding frame inside a bright beer tank in which the fermented beer is conditioned and carbonated. Finally, a dispensing mechanism is connected to the bright beer tank for discharging a consistent contaminant free beer product to serve drinking customers.

6 Claims, 8 Drawing Sheets

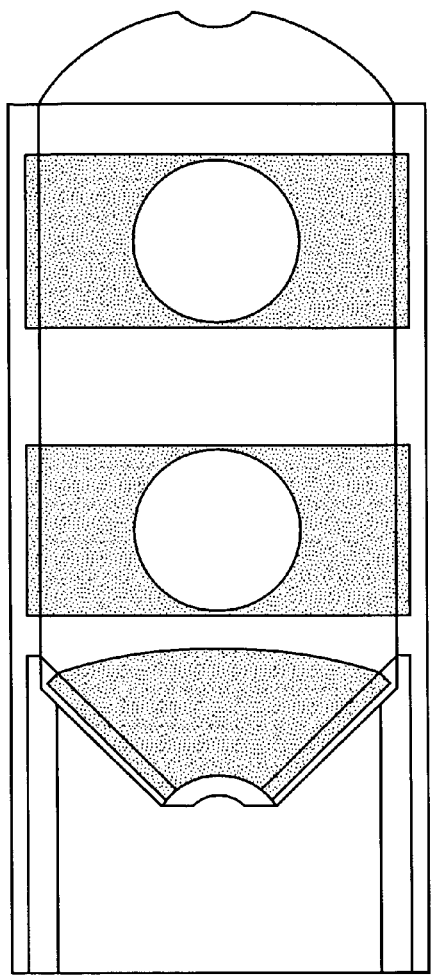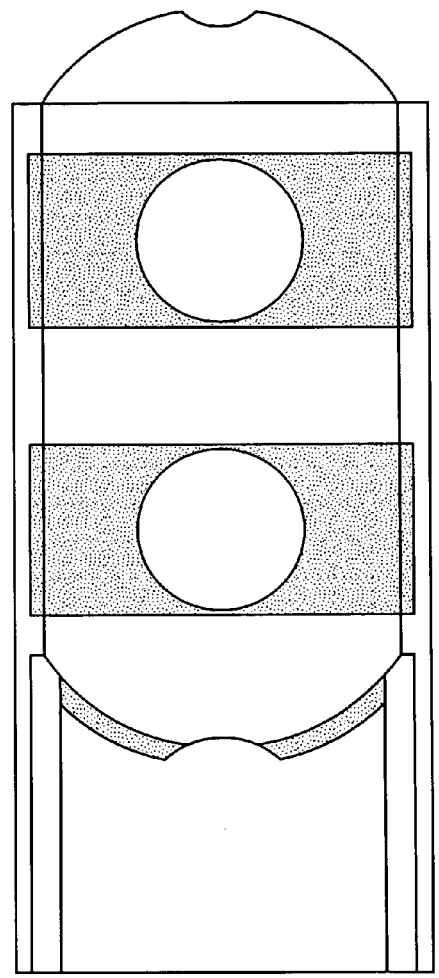
FIG. 1     FIG. 2

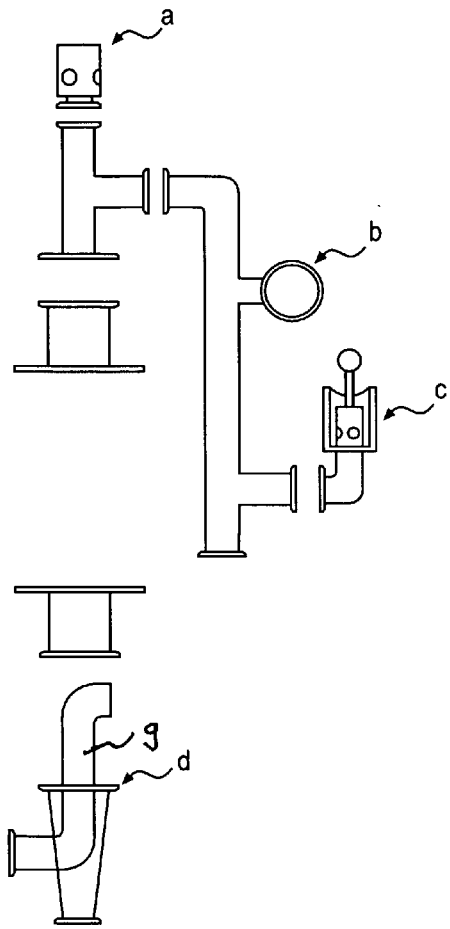
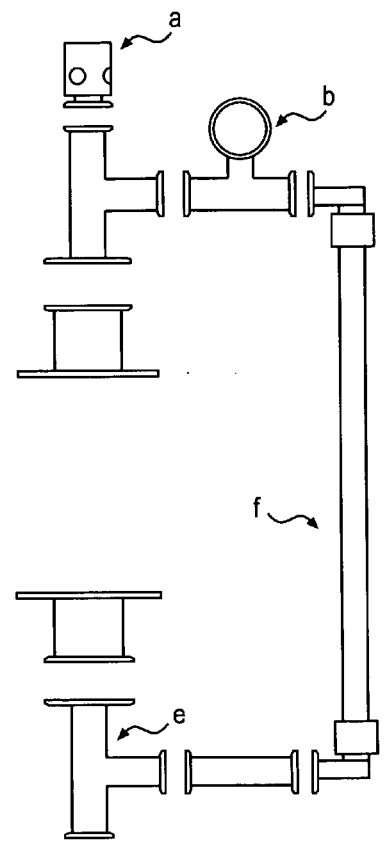
FIG. 5a          FIG. 5b

BREWING APPARATUS AND METHOD

RELATED APPLICATION

This is a non-provisional application for which priority is claimed in Provisional Application No. 61/852,063 filed Mar. 15, 2013.

BACKGROUND OF THE INVENTION

Field of Invention

The invention is a system for creation of finished beer using a unique process. This process was created to fill a need that has emerged in the craft beer industry. In 1980, there where about 100 large and small scale breweries in America. Since that time, the number of breweries in the United States has grown to more than 2000 breweries. These breweries are mostly small in scale, less than 10,000 barrels a year. This has resulted in significant changes and challenges for the continued growth and development in the beer market that our system is designed to address.

Background of the System

As micro breweries and brew pubs began to grow in numbers at greater velocity during the later half of the 1990's and 2000's so has the cost of production. The size and fixed cost of the significant space that is normally required for a small scale brewery and its inventory of raw materials is often situated in expensive retail location. When the rising cost of labor and raw materials are added to the fixed costs with a limited production capability, the costs of producing a serving of beer can force a higher market price that limits sales.

The rising cost of production is a major deterrent to the continued growth of the brewing industry in terms of new breweries opening and entering the marketplace. In the production department of small scale brewing operations, costs are often relatively high in relation to the volume of beer produced partially due to the requirement for a very high sanitary environment. Brewery equipment must be maintained in a sterile environment which necessitates the use of many chemical compounds that do not blend favorably with today's environmental policies to protect the ecosystem. In addition to the cost of wasted water consumption in the cleaning and sanitizing process, and waste disposal there is the high labor cost of maintaining favorable brewing conditions.

Even if production can be increased, another obstacle is created, namely, the three tiered system of liquor distribution in the United States that includes producers, distributors, and retailers. The basic structure of the system is that producers can sell their products only to wholesale distributors who then sell to retailers, and only retailers may sell to consumers. Producers include brewers, wine makers, distillers and importers. However, regulations vary from state to state.

The three tiered system limits sales opportunities and has resulted in fierce competition amongst the new small scale breweries for "shelf space" in the retail marketplace and "serving taps" in the food and beverage market. The marketplace demand for craft brewed beer has responded quite favorably to the wider selection of tastes and styles offered in spite of higher retail prices. However, access to these market windows is costly for the small scale brewer. This market place reality has created marketing challenges that have resulted in higher production costs for the small scale brewery because they are experiencing greater difficulties in obtaining sales volume to support cost of operations.

SUMMARY OF THE INVENTION

The invention is directed to a brewing system for fermenting beer when isolated from any possible micro-biological contamination. Our system comprises a first holding frame in a fermentation tank, a second holding frame in a bright beer tank, a water supply subsystem that is effective to measure, filter, and expose incoming water to UV light, a mixing subsystem that is effective to connect fittings or glands clamped onto manifolds of the fermentation and bright beer tanks, and bags containing dry ingredients of powdered malt extract, beer mixes, hops, and yeast. It includes first aseptic dry, sealed bags of powdered malt, beer mixes, hops, and yeast. The brewing system includes means for connecting the water supply subsystem to the fermentation tank, and means for transferring the powdered malt into a disposable second aseptic dry, sealed fermenter bag for fermentation in the fermentation tank to form fermented beer. After fermentation in the disposable aseptic fermenter bag that has ports on a bottom manifold and the fermenter bag is designed to fit into the first holding frame that is insulated and custom controls its temperature. Transfer means directs the fermented beer into a third aseptic bag disposed on a second holding frame inside a bright beer tank to condition and carbonate the fermented beer in the bright beer tank. Finally, means is connected to the bright beer tank for discharging a consistent contaminant-free beer product to serve to drinking customers.

In a specific embodiment, the fermenter bag is composed of approved food safe material, and powdered malt extract, beer mixes, hops, and yeast are sealed in bags to maintain the ingredients in a sanitary environment during shipping and storage for use in the brewing system.

Another aspect of the invention is directed to an aseptic brewing process for fermenting beer when isolated from any possible micro-biological contamination. The brewing process comprises introducing powdered malt extract, beer mixes, hops, and yeast into an aseptic fermenter bag designed to fit into or disposed on an insulated and temperature controlled custom holding frame within a fermentation tank. The process includes providing a disposable fermenting bag sanitized when manufactured and sealed to maintain a sanitary environment during shipping and storage. A new clean bag is installed at the beginning of each batch of beer being brewed and disposed of after the beer is transferred to a bright beer bag. Malt extract is packaged dry in a sanitary manner when manufactured and sealed into a bag, and a mixing subsystem is used to combine the dry ingredients with purified water, mixed to form a mixture, and to heat treat and cool the mixture. A water supply subsystem is provided to measure, filter, and expose incoming water to UV light to create a fermentable wort that is clean from biological contamination. Consequently, the entire brewing process is effectively encapsulated from receiving or handling the powdered malt in an aseptic bag because of the transfer of the powdered malt from a first aseptic bag into a second aseptic fermenter beer brewing bag in a fermentation tank, and then, after fermentation into a third aseptic bag fit inside a frame in a bright beer tank to condition and carbonate a brewed beer mixture.

In a specific embodiment, a brewing process comprises an installing step that provides a control subsystem for effecting computer control of the brewing process and securing a fermentation bag at the top and bottom fitting to the holding frame, and connecting said water subsystem to the bottom manifold of said fermenter bag. The control subsystem is accessed to automatically control the desired final volume by entering an amount of water into an input field to begin filling when all of the valves inline with the water subsystem are open. The water is allowed to flow from a potable source, to a carbon filter, then pass a control valve, enter a flow meter to a UV sterilizer so that when the desired volume is reached, the control valve will automatically close and the bag will stop filling.

The mixing subsystem of this embodiment includes a jet pump and an ultra-low penetration air filter. The mixing subsystem connects to ports on the bottom manifold of the fermenter beer brewing bag, and determines the number of bags of malt extract and amount of hops to add for different bitterness and aroma levels that the control subsystem displays to be used in the mixture. A bag of malt extract is placed onto the filling spear on the mixing subsystem. The power to the mixing subsystem is turned on so that the malt extract powder will be drawn into the filling spear by suction created by the jet pump or eductor. Some air may be required to regulate the flow of the jet pump and this air may be drawn from an ultra-low penetration air (ULPA) filter box thru a manual valve. As brewing water enters the mixing subsystem, it first flows through a circulating pump then into the jet pump, then to first heat exchanger to bring the liquid mixture to a temperature above 165° F., then into a second heat exchanger that cools the mixture to 70° F. before exiting the subsystem to return to the fermenter bag.

BRIEF DESCRIPTION OF DRAWINGS

Other objects of this invention will appear in the following description, reference being made to the accompanying drawings forming a part of the specification wherein like reference characters designate corresponding parts to the several views.

FIG. 1 is a front elevational view of a fragmentation bag frame for a beer brewing apparatus of the invention;

FIG. 2 is a front elevational view of a Bright Beer bag frame for a beer brewing apparatus of the invention;

FIG. 5a is an exploded diagrammatic view of a fermenter (not shown) with a pressure gauge and adjustable pressure relief valve disposition for use in a fermenter tank for a beer brewing apparatus of the invention;

FIG. 5b is an exploded diagrammatic view of a Bright Beer bag tank (not shown) with a pressure relief valve, a pressure gauge, a sight glass and bottom manifold for use in a Bright Beer tank for a beer brewing apparatus of the invention;

DESCRIPTION OF SPECIFIC EMBODIMENT

An Aseptic Process

The genesis of our brewing equipment invention is the brewing process developed for The Beer Machine®. The concept of the unique brewing system is using powdered malt extract, beer mixes, hops, and yeast to introduce them into a fermentation bag, that is designed to fit into an insulated and temperature controlled custom holding frame.

The basic fundamental rule for fermenting beer is that the process must be isolated from any possible micro-biological contamination as much as possible. In a modern brewery this is done with a combination of boiling the product before fermentation and cleaning all vessels, equipment, etc. with a large amount of water and chemicals, both caustic and acid.

In our system, the disposable fermenting bag is sanitized when manufactured and sealed to maintain a sanitary environment during shipping and storage. The fermentation bag is made out food safe, approved material. A new clean bag is installed at the beginning of each batch and disposed after the beer is transferred to a bright beer bag. The bag can either be disposed of as garbage or recycled, if local facilities exist. The Bright Beer Bag™ is manufactured in the same manner as the fermenter bag but comes in two configurations, described below. One configuration has a single layer of plastic that separates the beer from the frame. The other has two layers of plastic.

Figure 6:
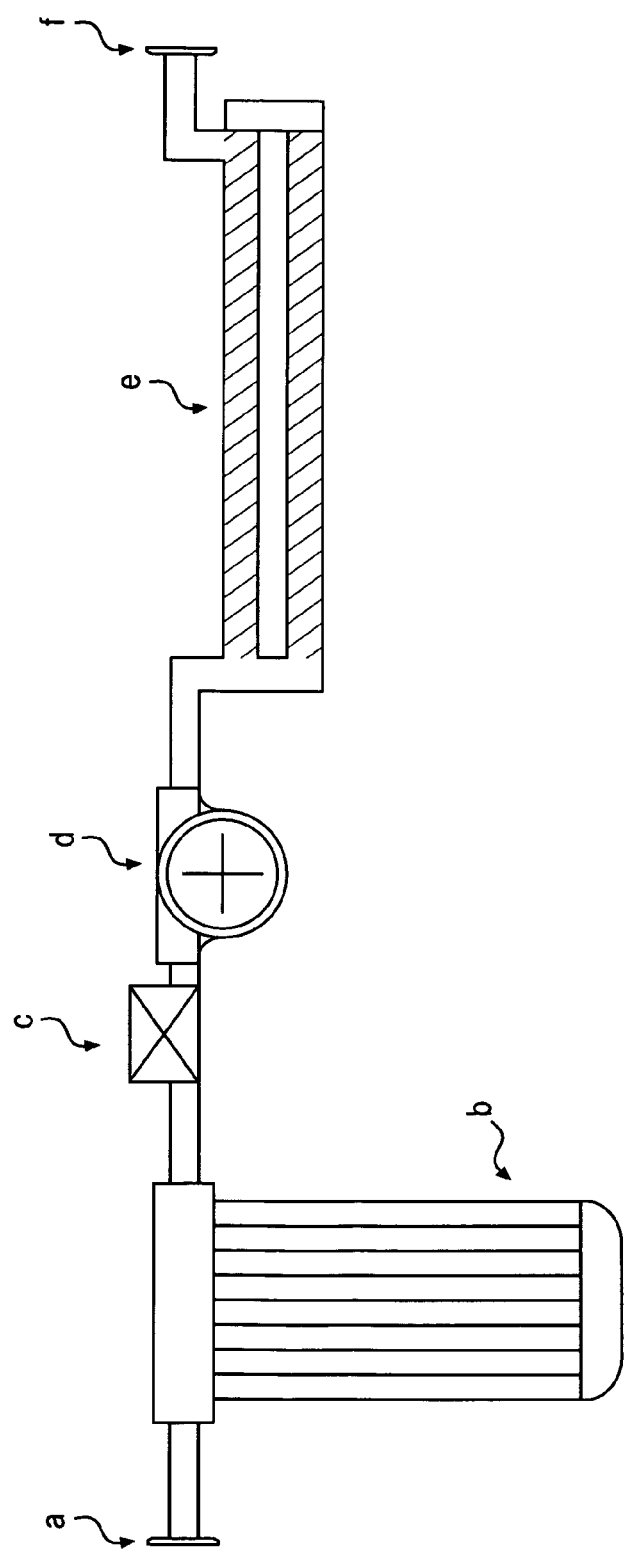
FIG. 6 is a schematic view of a water subsystem for a beer brewing apparatus and method of the invention.
Figure 8:
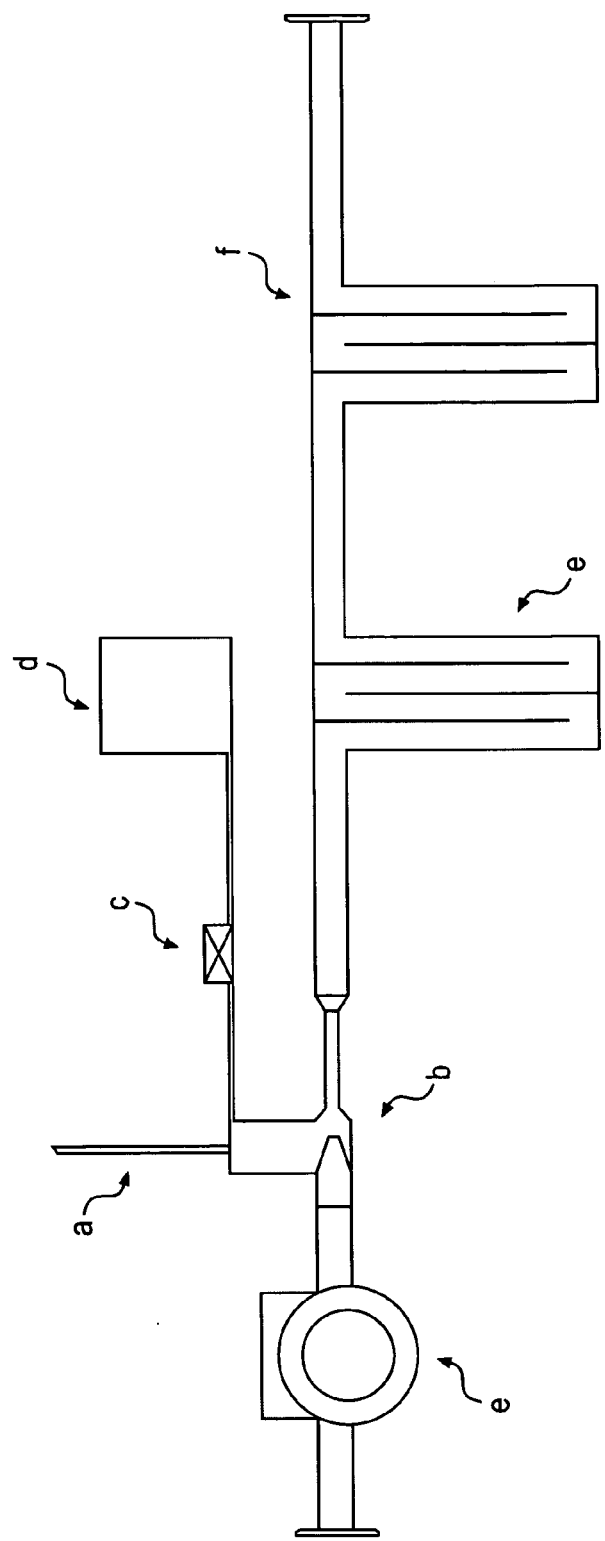
FIG. 8 is a schematic view of a beer mixing substation for a beer brewing apparatus and method of the invention.

The malt extract is likewise packaged dry in a sanitary manner at the place of manufacture and sealed into a bag. A number of these small bags of malt extract are then sealed into an outer bag or bucket for shipping. A mixing subsystem is used to combine the dry ingredients, mix and heat treat the mixture. See FIG. 8. A water supply subsystem measures, filters, and exposes incoming water to UV light. See FIG. 6. All of these subsystems combine to create a fermentable wort that is clean from biological contamination.

The entire brewing process is effectively encapsulated from receiving or handling the powdered malt in an aseptic bag because of the transfer of the powdered malt from a first aseptic bag into a second aseptic brew bag for fermentation, and then after fermentation into a third aseptic bag fit inside a Bright Beer frame to condition and carbonate a brewed beer mixture. Even brewer's yeast from the fermentation bag is harvested after fermentation into a designed yeast propagation bag and stored in a temperature controlled environment until the next batch is scheduled for fermentation.

Consequently, the brewing and conditioning process of the invention is completed entirely in aseptic disposable bags within a totally enclosed environment including the transfer of finished product from bag-to-bag. The process eliminates the costly and time consuming process of cleaning the fermentation tanks and bright beer tanks because the brewing and conditioning process is totally contained within the aseptic bag-to-bag process. When completed, the bags are simply disposed as garbage or are recycled and a new batch is begun with new aseptic brew bags.

The Unique Brewing Process

Figure 4:
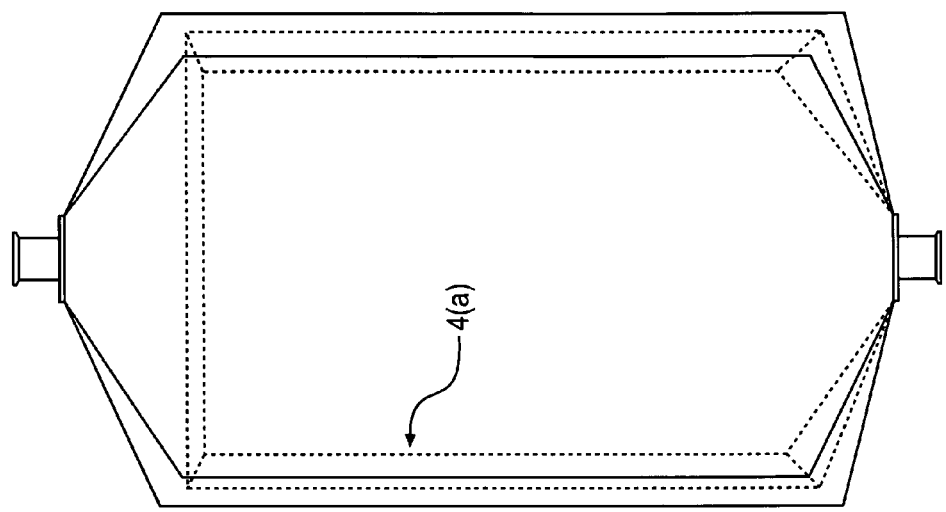
FIG. 4 is a diagrammatic view of a Bright Beer bag having a molded plastic clamp gland welded to its top and bottom for a beer brewing apparatus of the invention.
Figure 3:
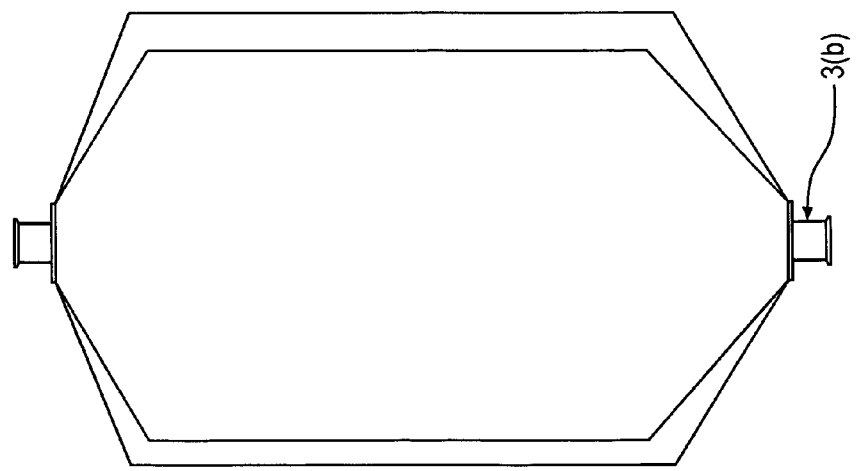
FIG. 3 is a diagrammatic view of a fermentation bag having a molded plastic clamp gland welded to its top and bottom for a beer brewing apparatus of the invention.

1) Referring to FIG. 1 of a fermenter frame, and FIG. 2 of a Bright Beer™ frame, an aseptic Fermentation™ bag (FIG. 3) and an asceptic Bright Beer™ bag (FIG. 4) are each respectively fitted into the Fermentation and Bright Beer frames. The frames provide support for the biological process, namely temperature control, light blocking, and structure. The frame is skinned with a highly polished metal covering for high visibility and marketing appeal. The internal construction of the frame for both the Fermentation and Bright Beer bags is similar with the main difference being the shape of the bottom of frame. The bottom of the fermentation frame is conical, see FIG. 1, whereas the bottom of the Bright Beer bag frame is concave, see FIG. 2. The bags are fitted with top and bottom molded plastic fittings 3b or "glands," see FIG. 3, that fit through the top and the bottom openings in the fermenter and bright beer frames and tanks. These openings and fittings 3b provide for both the addition and removal of materials from the fermentation bags and Bright Beer bags.

The fittings 3b or glands (FIG. 3) are clamped onto manifolds 5ad and 5be, as shown in FIGS. 5a and 5b, that receive the various attachments used to connect to the water and mixing subsystems, and other equipment used throughout the process. Other attachments to these fitments include valves, namely, an over-pressure safety valve 5aa, 5ba for excess pressure blow-offs, pressure gauges 5ab, 5bb, and fermentation excess pressure blow-off fitment 5ac. The bottom gland also connects with a manifold 5ad that receives a transfer pipe 5ag extending above residue of the fermentation process and is attached to a transfer pump (not shown) to transfer fermented beer to the bottom inlet of the Bright Beer tank. A yeast harvest bag or drain pipe may be connected to the bottom of manifold 5ad to discard fermentation residue. Once the fermented beer is introduced from the fermenter into the bottom of the Bright Beer bag to be filled for carbonization, the transfer pump is detached from and a carbonization stone is attached to the bottom gland to effect carbonization of the beer. The fluid (beer) and gas inlets have been combined into a single opening in FIGS. 4 and 5b that shows a Bright Beer bag having a second layer of material (shown in dashed lines) to act as a barrier. The double-walled Bright Beer bag forms an annular chamber for forcing beer downwardly out the bottom of the bag to be dispensed after being carbonized in the Bright Beer bag. This enables the use of any type of gas to force the finished beer product downwardly to a selected bottom dispensing mechanisms for the second material layer separates the beer from the gas. So use of expensive $CO_2$ is not necessary to force finished beer from the bottom of the Bright Beer bag. Thus, any type compressed gas, namely, $CO_2$, $O_2$, compressed air, and the like. This disclosed structural configuration provides for a complete transfer of finished fermented beer through a completely closed system for brewing, carbonating, conditioning, handling and serving consistent contaminant-free beverage. Additionally, the bottom manifold 5be on the Bright Beer bag provides for a sight glass 5bf that is used to measure the amount of beer in the tank for inventory and tax determination purposes. The Fermentation and Bright Beer tanks are double-walled and insulated with jacketed plating that circulates a coolant for maintaining the desired optimum brewing and conditioning temperatures that are controlled by sensors that regulate the brewing and conditioning temperatures to predetermined settings. In another embodiment, an aseptic bag for a Bright Beer tank may be shaped like the construction of the aseptic Fermenter bag in FIG. 3 where $CO_2$ may be introduced at the top of the Bright Beer tank to induce pressure directly on the beer to be forced to a dispensing mechanism. In the single-walled version, gas used to push beer to distribution service must be food grade $CO_2$ so that when it comes in contact with the finished carbonized beer, it does not change its flavor, oxidize, or contaminate it in any way.

Figure 7:
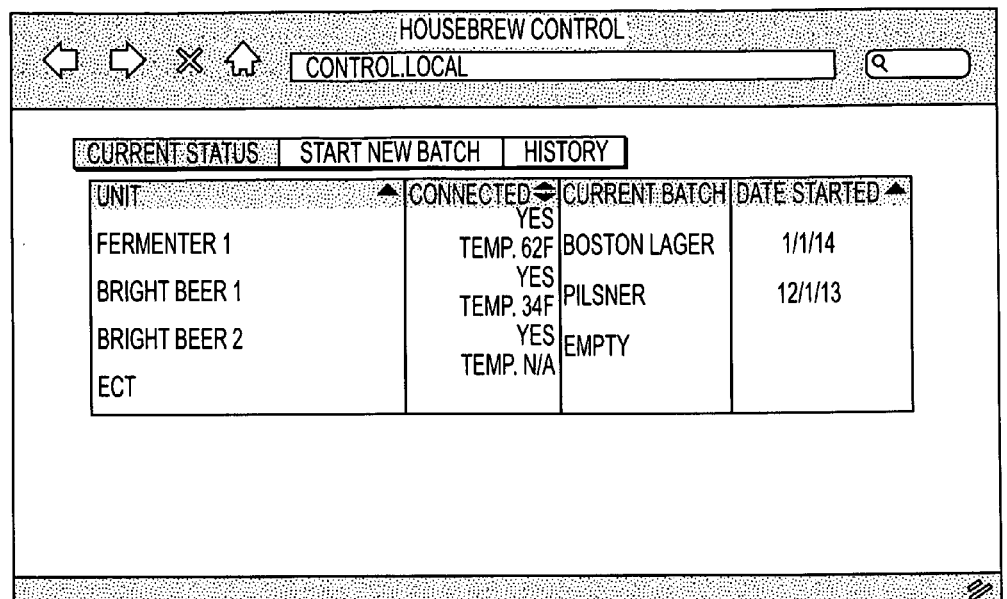
FIGS. 7, 7a, 7b, 7c, 7d, and 7e depict the control interface of a control website to show and explain the operation of the beer brewing apparatus and method of the invention.
Figure 7A:
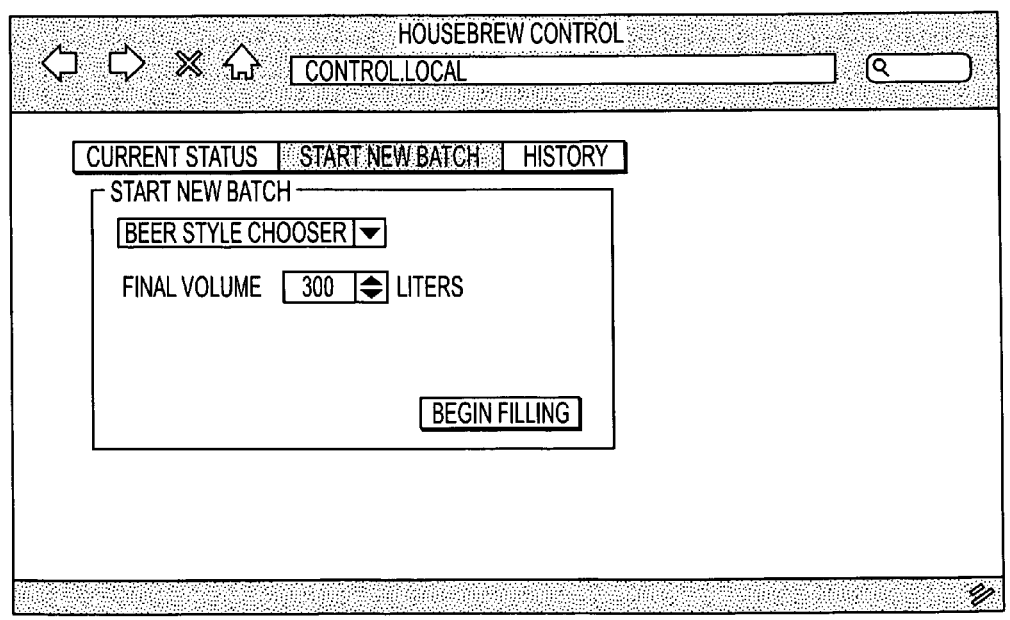
Figure 7B:
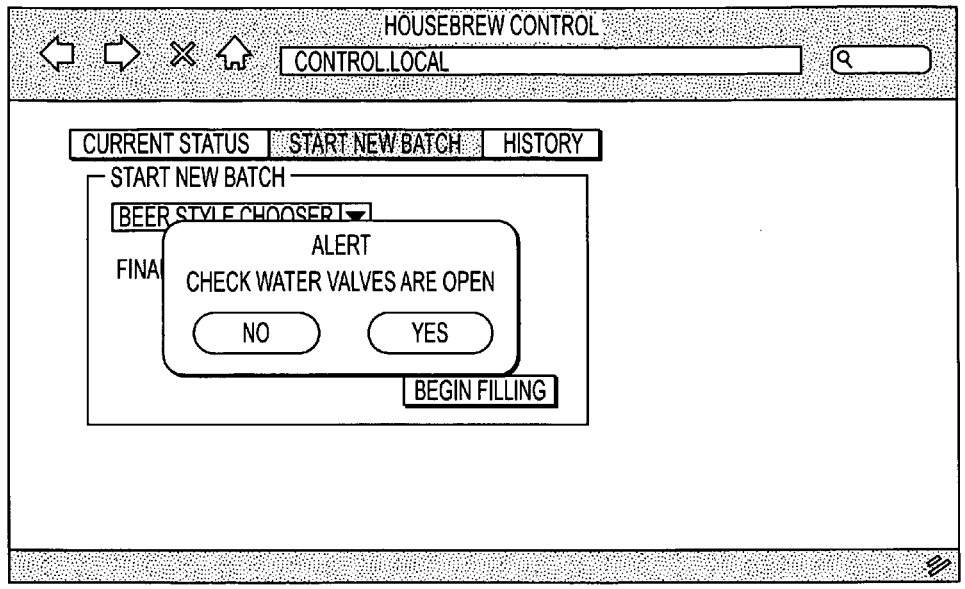

2) After the Fermentation bag is secured at the top and bottom gland to the frame, the water subsystem (FIG. 6) should be connected to the fermenter bag by the bottom manifold. The control subsystem is then accessed via a control website and a "Start a New Batch" is selected via the control interface (FIG. 7). The desired final volume is entered into an input field and "Begin Filling" (FIG. 7a) is selected. The control system will ask the operator to verify that all of the valves inline with the water subsystem are open (FIG. 7b). Once verification is complete the water subsystem will open a control valve and measure the water as it enters the fermenter bag. The progress as well as a "Pause" and "Cancel" button (FIG. 7c) will be displayed by the control website. The water will flow from the potable source (a) (FIG. 6) to a carbon filter 6b, then passing control valve 6c and entering the flow meter 6d to a UV sterilizer 6e. When the desired volume is reached, control valve 6c will automatically close and the bag will stop filling. The control system will instruct the operator to close the valves opened earlier in the step and disconnect the water subsystem from the fermenter bag. By precisely measuring the water coming into the fermentation bag, the control subsystem can specify the amount of malt extract necessary to produce a wort with consistent density for any recipe regardless of final volume desired.

3) The operator should now connect the mixing subsystem (FIG. 8) to the ports on the bottom manifold 5Ad of the fermenter bag. The control website will display the number of bags of malt extract to be used in the mixture. It also displays a guide table for the amount of hops to add for different bitterness and aroma levels. (See FIG. 7c.) Place a bag of malt extract onto the filling spear 8a (FIG. 8) on the mixing subsystem. Turn on the power to the mixing subsystem. The malt extract powder will be drawn into the filling spear by the suction created by the jet pump 8b. Some air may be required to regulate the flow of the jet pump or eductor 8b and this air is drawn from an ultra-low penetration air (ULPA) filter box 8d thru a manual valve 8c. The ULPA filter can remove from the air at least 99.999% of dust, pollen, mold, bacteria and any airborne particles with a size of 120 nanometers (0.12 µm) or larger.

Figure 7C:
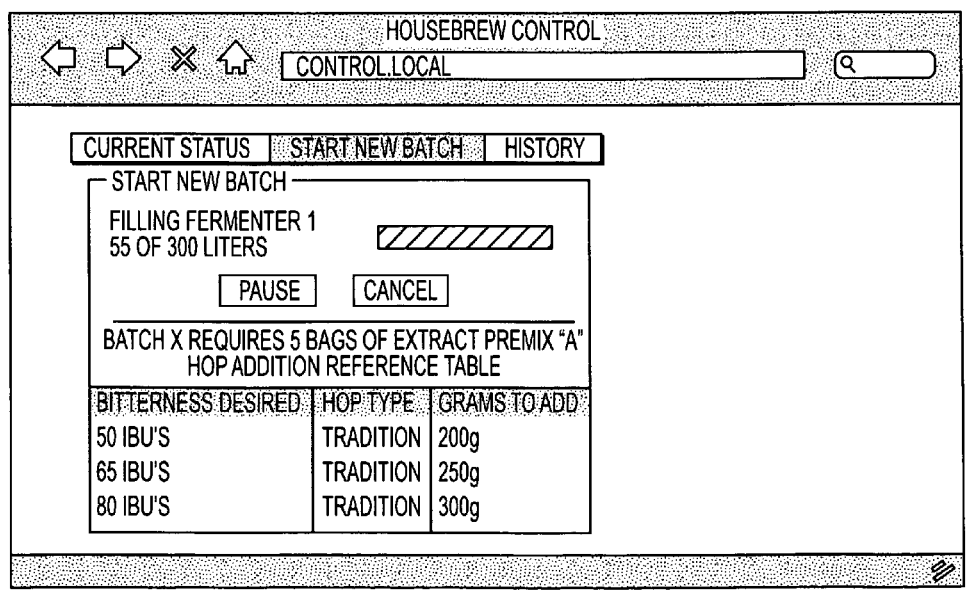
Figure 7D:
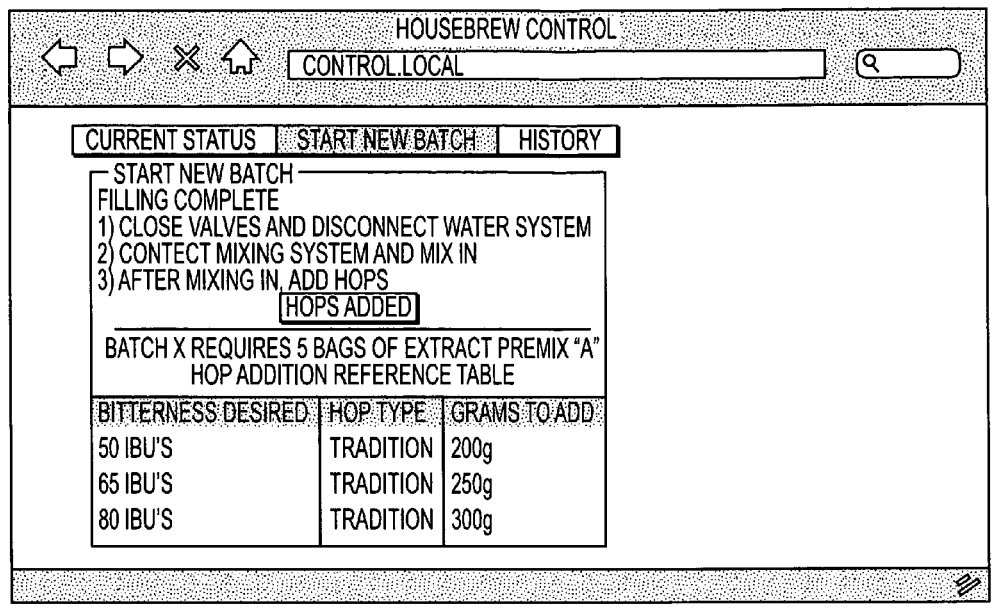

As brewing water enters the mixing subsystem, it first flows though a circulating pump 8d then into the jet pump 8b. From jet pump 8b then to heat exchanger 8e to bring the liquid mixture to a temperature above 165° F. then into a second heat exchanger 8f that cools the mixture to 70° F. before exiting the subsystem to return to the fermenter bag. The operator places as many bags onto the filling spear as is specified by the control system (FIG. 7c,d). After all of the malt powder is mixed in, power to the mixing subsystem is turned off. Valves on the fermenter bag are closed and the subsystem is disconnected.

Figure 7E:
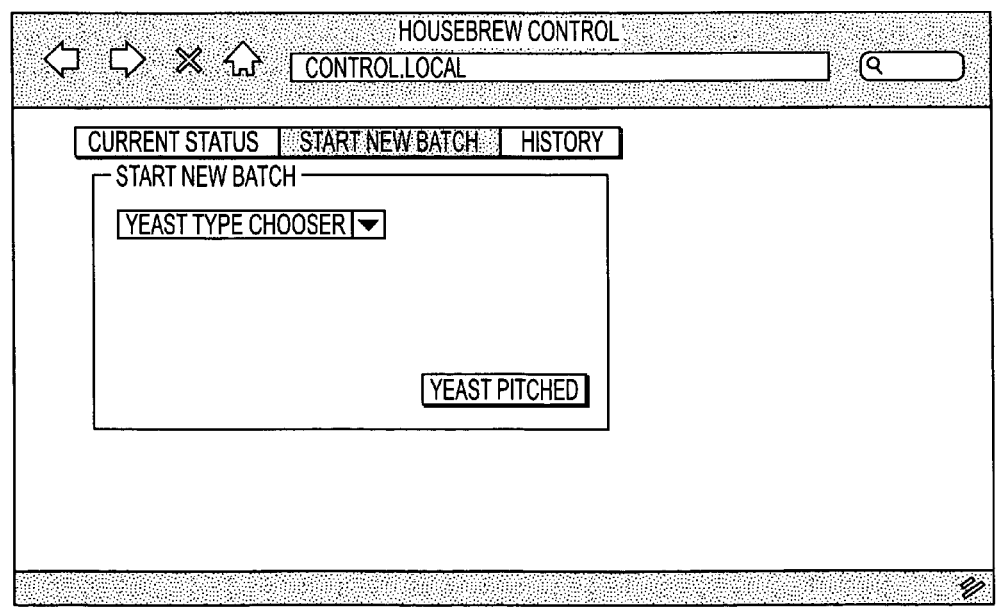

4) Add the hops by removing the top manifold of the fermenter bag and dumping them into the mixture. Reconnect the top manifold as quickly as possible. In the control website, click the "Hops Added" button (7c,d) and select the type of yeast used 7(e), yeast type will be labeled on each yeast bag. Add the final ingredient, the yeast connecting the yeast bag to the fermenter and "pitch" add the yeast. Now click "Yeast Pitched" in the control website (FIG. 7e). The control system will begin to monitor and control the temperature of the fermentation automatically based on the yeast type selected. Disconnect and dispose the yeast bag as garbage.

5) The fermentation should take about 12 to 24 hours to begin and will last between 5 and 7 days depending on the type of yeast used and the amount of sugar in the wort. After the fermentation is completed to the desired specific gravity in the fermentation brew bag in the fermenter frame, the temperature control setting is reduced to a cold temperature below 35° F. that will stop any further meaningful fermentation and the brewer's yeast will fall (flocculate) to the bottom of the brew bag in the fermenter tank. This process is called flocculation and is a standard procedure in conventional brewing. This "cold break" will generally last from 24 to 48 hours and the yeast will have settled to the bottom of the fermenter bag in the lower conical section of the fermenter frame.

6) After the cold break, usually around the seventh day, the beer is ready to be transferred to the aseptic bright beer bag which is fitted inside of the bright beer frame. Before making the finished beer transfer from the fermentation bag, the yeast that has settled in the conical section of the fermentation bag frame at the bottom of the fermenter tank is removed from the fermentation bag through a discharge valve at the bottom of the fermenter cone and transferred into a new aseptic yeast bag. This bag is then stored between 33° F. and 36° F. in a refrigerator to preserve the yeast without allowing addition growth. After yeast harvesting, the beer is then transferred into the Bright Beer bag where it is conditioned and carbonated.

7) After carbonation and 2 or 3 days of cold temperature conditioning, the beer in the Bright Beer bag is ready for sampling and subject to taste expectations, it is then ready for dispensing to kegs, transfer to a bar dispenser, or whatever other packaging is desired.

SUMMARY OF THE INVENTION BENEFIT POINTS

1) The entire brewing and conditioning process from beginning to dispensing has been completed through aseptic bag to aseptic bag transfers thereby eliminating the costly, laborious, and troublesome cleaning and sanitizing of stainless steel tanks with chemical cleaners and wastage of water.

2) The fermenter, bright beer and yeast bag retain and confine the waste material from brewing in the disposable fermenter bag thereby simplifying and eliminating costly waste management disposal procedures.

3) The powdered beer mixes have eliminated preparatory steps and costly equipment and space required for the preparation of raw materials which is also labor intensive in the traditional brewing processes.

4) The equipment of the invention accommodates the aseptic bag brewing process from start to completion.

5) The invention reduces the amount of space required for equipment users to become small scale brewer in the craft beer market.

6) The invention not only reduces the fixed overhead costs in traditional brewing processes but also reduces the entry cost for becoming a small scale brewer in the craft beer market. While a single unit fermenter tank can produce 500 liters of beer each week, the entire system is repeatable so that two (2) fermenter tanks can increase volume of beer production to 1000 liters per week, and three (3) fermenter tanks can increase beer volume to 1500 liters per week and so on.

7) A substantial production cost over traditional brewing systems is saved because the operator needs no special skills. All of the control is handled automatically by the control system. Therefore a "Brewmaster" is not required as the powdered beer mixes are purchased ready to brew with only the addition of water hops and yeast that the system has automated.

8) The control system has preprogramed values for exact reproduction of the a pervious batch, further allowing the use of unskilled labor in production.

9) The control system records every batch made and allows for exact reproduction of any pervious batch, further allowing the use of unskilled labor in production.

10) The powdered beer mixes, or in the alternative, prepared liquid worts the operator of the invention can be blended with various available powdered beer mixes and flavor extracts offered to provide many different flavors and styles of beer to suit the operators preference.

11) The consequences of the efficiencies of the system is that the cost per serving for the small brewery operator is significantly reduced in most cases thereby increasing the operator's profit per serving.

While the brewing apparatus and method has been shown in detail, it is obvious that this invention is not to be considered s limited to the exact form disclosed, and that changes in detail and construction may be made therein within the scope of the invention without departing from the spirit thereof.

We claim:

1. A brewing system process for fermenting beer when isolated from any possible micro-biological contamination, said system process comprising:
    a) providing a first holding frame in a fermentation tank having manifolds, a second holding frame in a bright beer tank, a water supply substation that is effective to measure, filter, and expose incoming water to UV light, a mixing subsystem that is effective to connect fittings or glands clamped onto said manifolds of said fermentation tank and a bright beer tank;
    b) providing a first aseptic dry, sealed bag of powdered malt extract, beer mixes, hops, and yeast;
    c) connecting said water supply subsystem to said fermentation tank, and transferring said powdered malt extract from said first aseptic dry, sealed bag into a disposable second aseptic dry, sealed fermenter bag for fermentation to form fermented beer;
    d) after fermentation in said disposable aseptic fermenter bag having ports on a bottom manifold with said aseptic fermenter bag designed to fit into said first holding frame that is insulated and custom controls the temperature of said first holding frame;
    e) transferring the fermented beer into a third aseptic bag fit on said second holding frame inside a bright beer tank for conditioning and carbonation of fermented beer in said bright beer tank, and
    f) providing means connected to said bright beer tank for discharging a consistent contaminant-free beer product to serve to drinking customers.

2. A brewing system process as defined in claim 1, wherein,
    said fermenter bag is composed of approved food safe material, and said powdered malt extract, beer mixes, hops, and yeast are sealed in bags to maintain said ingredients in a sanitary environment during shipping and storage for use in said brewing system.

3. An aseptic brewing system process for fermenting beer when isolated from any possible micro-biological contamination, said brewing system process comprising:
    a) introducing powdered malt extract, beer mixes, hops, and yeast into an aseptic bag designed to fit into an insulated and temperature controlled custom holding frame within a fermentation tank;
    b) providing a sealed and disposable fermenting bag sanitized when manufactured to maintain a sanitary environment during shipping and storage;
    c) installing a first clean aseptic bag at the beginning of each batch of beer being brewed and being disposed after the beer is transferred to an aseptic bright beer bag;
    d) providing malt extract packaged in a sanitary manner when manufactured and sealed into an aseptic bag, and a mixing subsystem to be used to combine the dry ingredients with purified water, mix to form a mixture, and heat treat and cool the mixture;
    e) providing a water supply subsystem to measure, filter, and expose incoming water to UV light to create a fermentable wort that is clean from biological contamination;
    f) said entire brewing process is effectively encapsulated from receiving or handling the powdered malt extract in an aseptic bag because of the transfer of the powdered malt extract from a said first aseptic bag into a second aseptic fermenter beer brewing bag in a fermentation tank, and then after fermentation of said brewed beer, transferring it into a third aseptic bag fit inside a bright beer frame into a bright beer tank for conditioning and carbonation of a brewed beer mixture.

4. A brewing system process as defined in claim 3, wherein
said installing process step includes providing a control subsystem for effecting computer control of the brewing system process and securing a fermentation bag at the top and bottom fitting to the holding frame, and connecting said water subsystem to the bottom manifold of said fermenter bag;
accessing the control subsystem to automatically control the desired final volume of beer by entering into an input field to select an amount of water desired and to begin filling when all of the valves inline with the water subsystem are open;
allowing the water to flow from a potable source, to a carbon filter, then passing a control valve, entering a flow meter to a UV sterilizer so that when the desired volume is reached the control valve will automatically close and the bag will stop filling.

5. A brewing system process as defined in claim 3, wherein
said mixing subsystem includes a jet pump and ultra-low penetration air filter;
connecting said mixing subsystem to ports on the bottom manifold of said fermenter beer brewing bag, determining the number of bags of malt extract and amount of hops to add for different bitterness and aroma levels that the control subsystem displays to be used in the mixture;
placing a bag of malt extract onto the filling spear on the mixing subsystem;
turning on the power to the mixing subsystem so that the malt extract powder will be drawn into the filing spear by suction created by the jet pump;
some air may be required to regulate the flow of the jet pump and this air may be drawn from an ultra-low penetration air (UPLA) filter box thru a manual valve.

6. A brewing system process as defined in claim 5, wherein
as brewing water enters the mixing subsystem, directing it to first flow through a circulating pump then into said jet pump, then to said first heat exchanger to bring the liquid mixture to a temperature above 165° F., then into a second heat exchanger that cools the mixture to 70° F. before exiting the subsystem to return to the fermenter bag.

* * * * *